C. W. SHAUL.
PUNCHING AND CUTTING PLIERS.
APPLICATION FILED AUG. 5, 1920.
1,381,024.
Patented June 7, 1921.
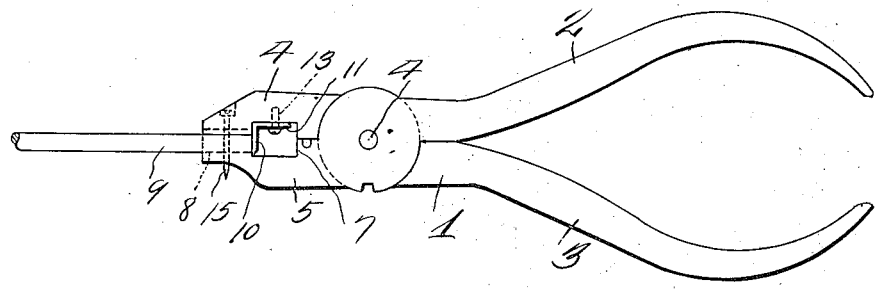
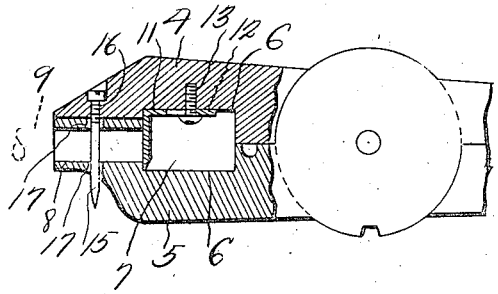
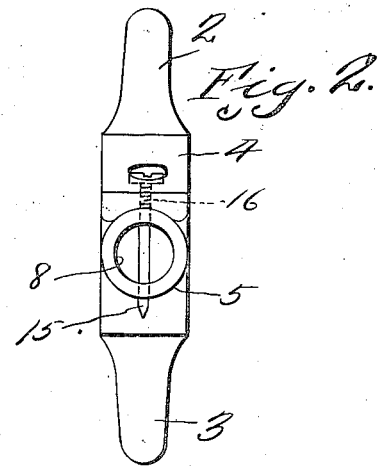
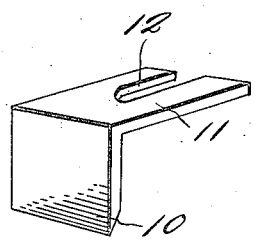
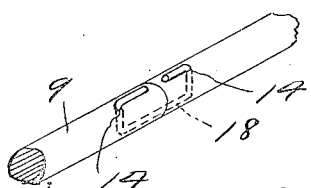
Inventor
C. W. Shaul
By D. Swift
Attorney

UNITED STATES PATENT OFFICE.

CHARLES W. SHAUL, OF GRINNELL, IOWA.

PUNCHING AND CUTTING PLIERS.

1,381,024. Specification of Letters Patent. Patented June 7, 1921.

Application filed August 5, 1920. Serial No. 401,404.

*To all whom it may concern:*

Be it known that I, CHARLES W. SHAUL, a citizen of the United States, residing at Grinnell, in the county of Poweshiek, State of Iowa, have invented a new and useful Punching and Cutting Pliers; and I do hereby declare the following to be a full, clear, and exact description of the invention, such as will enable others skilled in the art to which it appertains to make and use the same.

The invention relates to punching and cutting tools and has for its object to provide a tool of this character of the pivoted cross member type, one of said jaws of which is provided with a cylindrical bore for the reception of the end of a sewing machine strap. The other jaw is provided with an adjustable knife which will shear off the end of the belt at the same time that a punch is forced through the belt for forming an aperture adjacent the end of the belt, said belt passing through the cylindrical belt receiving member of the lower jaw.

A further object is to provide a right angled shaped knife member having one of its flanges provided with an elongated slot adapted to receive a set screw which passes through said slot and into one of its jaws, said set screw forming means whereby the angled knife member may be adjusted in relation to the belt punch.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the cutting and punching tool.

Fig. 2 is a front elevation of the tool.

Fig. 3 is a side elevation of the jaw end of the tool showing the jaws in section.

Fig. 4 is a detail perspective view of a cutting blade.

Fig. 5 is a perspective view of the belt joint.

Referring to the drawings, the numeral 1 designates the punching and cutting tool which comprises cross handles 2 and 3 which are pivotally united as at 4. Handle member 3 terminates in a jaw 4, while the handle member 2 terminates in a jaw 5. Jaws 4 and 5 are recessed as at 6 so as to form a rectangular shaped recess 7. The forward end of the jaw 5 is provided with a longitudinally disposed aperture 8, in which aperture the end of the belt 9 which is to be cut and punched is placed while the jaws are in open position. The longitudinally disposed aperture is preferably of substantially the same diameter as the belting 9 so that said belting will be securely held during a cutting and punching operation. The ragged end of the belting is severed by the knife flange 10 of an adjustable plate 11, said plate being at right angles to the knife 10 and provided with an elongated slot 12, to which slot the set screw 13 extends and is threaded into the upper jaw 4. By adjusting the knife 10 in relation to the inner end of the aperture 8, it will be seen that the distance of the hole 14 from the severed end may be gaged. The hole 14 is placed in the end of the belt by a punching member 15, which punching member is threaded in an aperture 16 of the jaw 4 and is adapted to pass downwardly through the apertures 17 in the jaw 5, said apertures 17 being diametrically disposed in relation to the longitudinally disposed aperture 8.

In sewing machine belts, it has been found extremely difficult to place the coupling 18 in position on the adjacent end of the belt 9, and the proper positioning of the holes 14 in relation to the ends of the belt, however, by providing a tool which may sever the ragged end of the belt at a right angle to its axis and simultaneously pierce the belt at a point the proper distance from the severed end, these difficulties are overcome. By providing an adjustable knife it will be seen that the knife may be adjusted for different sizes of couplings and belts. It will also be seen that a tool is provided which is compact, simple of construction and one wherein the parts are reduced to a minimum.

The invention having been set forth what is claimed as new and useful is:—

A belt cutting and punching tool comprising cross members, said members being pivoted together and provided at one of their ends with hand engaging members and their other ends with jaws, one of said jaws being provided with a longitudinally disposed cylindrical aperture, there being recesses in the jaws in communication with the rear end of the longitudinally disposed aperture, and vertically disposed apertures in one of said jaws and diametrically disposed in relation to the cylindrical apertures, a detachable punching element carried by the other jaw and so positioned that it will pass through the diametrically disposed apertures in the adjacent jaw when said jaws are closed, a right angled shaped knife plate disposed in the recess of the upper jaw, one of the flanges of said right angled knife plate being provided with means for securing and adjusting the same in the recess of the upper jaw and a knife edge carried by the lower end of the other right angled flange and adapted to shear off the end of the belt simultaneously with the punching and piercing operation.

In testimony whereof I have signed my name to this specification in the presence of two subscribing witnesses.

CHARLES W. SHAUL.

Witnesses:
H. B. WESTLAKE,
LIN H. HAMLIN.